(12) United States Patent
Hirukawa

(10) Patent No.: US 10,596,635 B2
(45) Date of Patent: Mar. 24, 2020

(54) CUTTING INSERT FOR BACK TURNING

(71) Applicant: TUNGALOY CORPORATION, Fukushima (JP)

(72) Inventor: Ryo Hirukawa, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 16/135,028

(22) Filed: Sep. 19, 2018

(65) Prior Publication Data
US 2019/0176241 A1 Jun. 13, 2019

(30) Foreign Application Priority Data

Dec. 13, 2017 (JP) .................. 2017-238953

(51) Int. Cl.
*B23B 27/14* (2006.01)
*B23B 27/04* (2006.01)
*B23B 27/16* (2006.01)

(52) U.S. Cl.
CPC .......... *B23B 27/145* (2013.01); *B23B 27/045* (2013.01); *B23B 27/141* (2013.01); *B23B 27/1614* (2013.01); *B23B 2200/087* (2013.01); *B23B 2200/369* (2013.01)

(58) Field of Classification Search
CPC ............... B23B 27/145; B23B 27/045; B23B 2200/087; B23B 2200/369
See application file for complete search history.

(56) References Cited

U.S. PATENT DOCUMENTS

2017/0066060 A1 3/2017 Tsuda

FOREIGN PATENT DOCUMENTS

| JP | 2012-250296 A | 12/2012 |
|---|---|---|
| WO | 2015-129836 A1 | 9/2015 |

*Primary Examiner* — Alan Snyder
(74) *Attorney, Agent, or Firm* — Studebaker & Brackett PC

(57) ABSTRACT

Provided is a cutting insert that improves chip control performance. In a cutting insert for back turning process, a chip breaker wall face, of a chip breaker, facing the axial feed direction includes: when viewed from a first face side, a first wall face portion configured so that a ridgeline connecting a top portion of the chip breaker and the first wall face portion is a straight line; and a second wall face portion connected to the first wall face portion on a first cutting edge side and configured so that a ridgeline connecting the top portion of the chip breaker and the second wall face portion is closer to a second cutting edge side than the straight line.

16 Claims, 5 Drawing Sheets

CUTTING INSERT FOR BACK TURNING

BACKGROUND

Field

The present invention relates to a cutting insert for back turning.

Description of Related Art

One of the demands for improvement of cutting inserts for back turning used in automatic lathes is chip control performance.

WO 2015/129836 discloses a cutting insert capable of smoothly discharging chips in back turning. Specifically, disclosed is a cutting insert (1) in which an opening angle (θ1) of a front wall face (21) facing a front cutting edge (13) of the wall face of a breaker groove (15) is larger than an opening angle (θ2) of a side wall face (22) facing a side cutting edge (14).

Patent Publication JP-A-2012-250296 discloses a throwaway tip that improves the discharge performance of chips in back turning and prevents the chips from damaging the machined surface of the object to be cut in a back turning. Specifically disclosed is a through-away tip 40 in which the height of a second ridgeline 52 where a cutting edge is not formed, in a state where the rake face 41 is viewed from the front, is formed to be equal to or greater than the height of a first cutting edge 61 and a second cutting edge 62 over a predetermined range from an intersection point 70a where the linear shape of the first cutting edge 61 and the linear shape of the second ridgeline 52 intersect.

SUMMARY

However, the problem of deterioration of chip control performance due to the formation of elongated chips, which is inherent to the back turning, has not been sufficiently solved.

Where the chip control performance is poor, the chips need to be removed manually. Therefore, a machine tool such as a lathe and the like needs to be stopped each time the chips are removed. It is particularly necessary to improve chip control performance in a small lathe called an automatic lathe, since a space inside the machine is small and chips tend to accumulate inside the machine.

Accordingly, it is an object of the present invention to provide a cutting insert for back turning which makes it possible to improve chip control performance.

A cutting insert for back turning according to one aspect of the present invention comprises: a flank facing a first direction; a first end face connected to the flank and facing a direction opposite to the first direction; a first face connected to the flank and the first end face, and including a rake face; a first ridgeline connecting the flank and the first face so that an angle with the first direction increases as a distance from the first end face increases, when viewed from the first face side; a second ridgeline connecting the first end face and the first face; and a chip breaker formed at the first face between the first ridgeline and the second ridgeline.

Further, a nose portion connected to the second ridgeline, a first cutting edge connected to the nose portion, and a second cutting edge connected to the first cutting edge are formed on the first ridgeline.

A chip breaker wall face, of the chip breaker, facing the first direction has: when viewed from the first face side, a first wall face portion configured so that a ridgeline connecting a top portion of the chip breaker and the first wall face portion is a straight line; and a second wall face portion connected to the first wall face portion on the first cutting edge side and configured so that a ridgeline connecting the top portion of the chip breaker and the second wall face portion is closer to the second cutting edge side than the straight line.

However, a face facing a predetermined direction, such as the flank facing the first direction (for example, an axial feed direction), is not limited to a case where the normal to the face is in the predetermined direction, and is inclusive of cases where the normal is inclined to form an acute angle.

In addition, the feature in which the ridgeline connecting the top of the chip breaker and the first wall face portion is linear is not limited to the case where the ridgeline is perfectly straight. Thus, the ridgeline may be curved with the angle of the tangent being within a predetermined range (for example, the difference in angle may be within 5 degrees). However, it is necessary that the ridgeline connecting the top of the chip breaker and the second wall face portion be closer to a main cutting edge side than the linear ridgeline having the average angle and connecting to the first wall face portion.

The top portion of the chip breaker may be a flat surface or a curved surface or may be a line segment consisting of a straight line or a curved line (in this case, the top portion becomes the ridgeline itself), but the top portion of the chip breaker is discontinuously connected to the first wall face portion and the second wall face portion, respectively, of the wall face of the chip breaker. Meanwhile, it is preferable that the first wall face portion and the second wall face portion be continuously and smoothly connected.

In addition, the rake face is the face that plays the role of scooping the chips, and the first face includes the rake face.

Further, the feature in which the angle with the first direction increases as the distance from the first end face increases is not limited to the case where the angle with the first direction monotonically increases as the distance from the first end face increases and is inclusive of a case where the angle stepwise increases for each predetermined portion.

DETAILED DESCRIPTION

First Embodiment

Figure 1A:
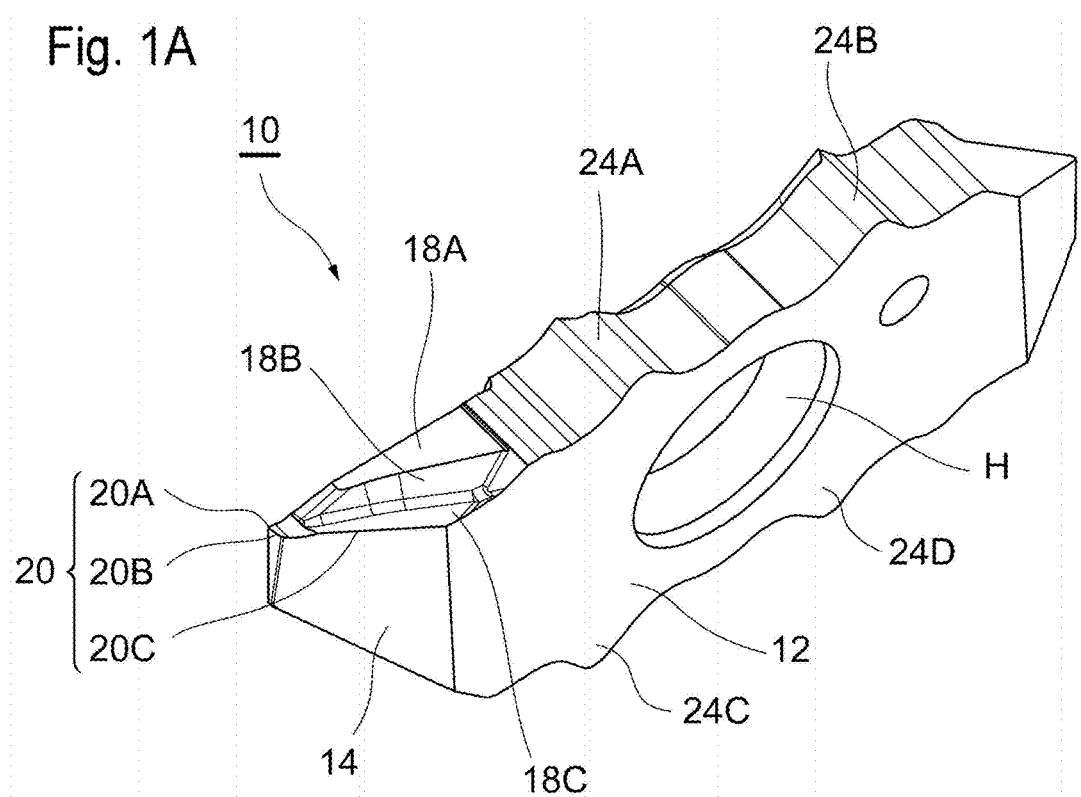
FIGS. 1A and 1B are respectively a perspective view and a right side view of a cutting insert 10.

Hereinafter, embodiments of the present invention will be described in detail with reference to the drawings. The same elements are denoted by the same reference numerals, and redundant explanation is omitted. In addition, the following embodiments are examples for explaining the present invention, and the present invention is not intended to be limited only to the embodiments thereof. Furthermore, the present invention can be variously modified without departing from the gist thereof.

Figure 1B:
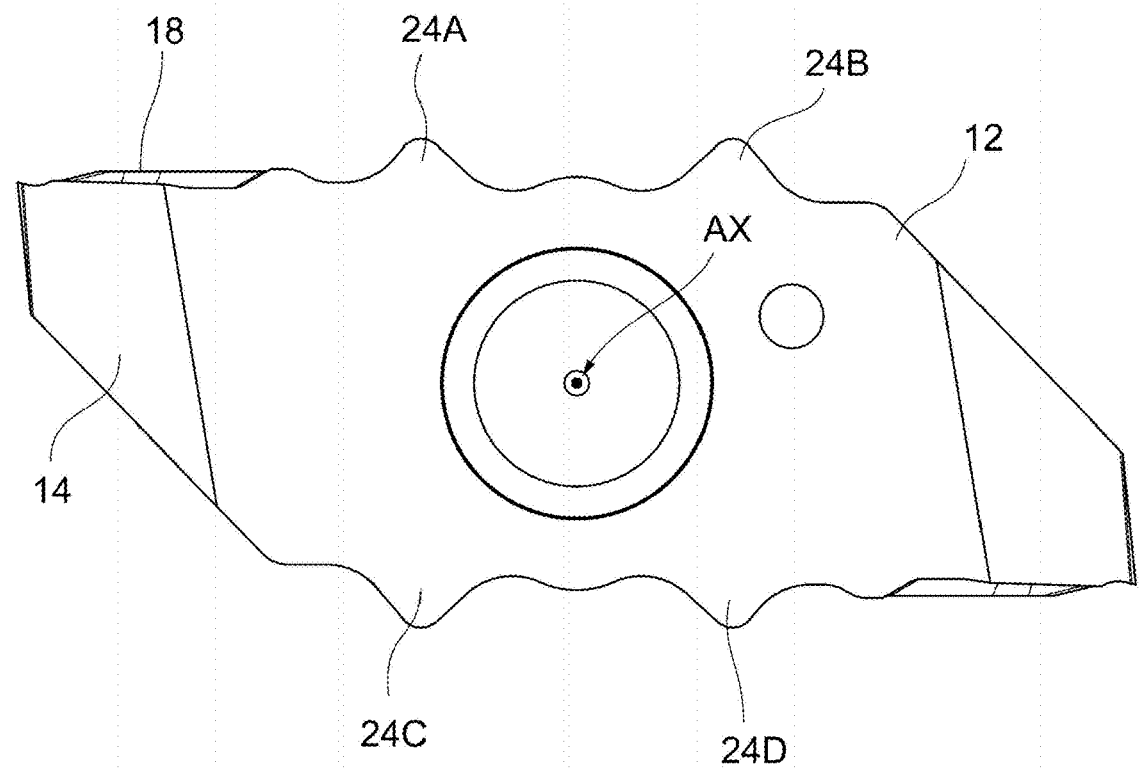
Figure 2A:
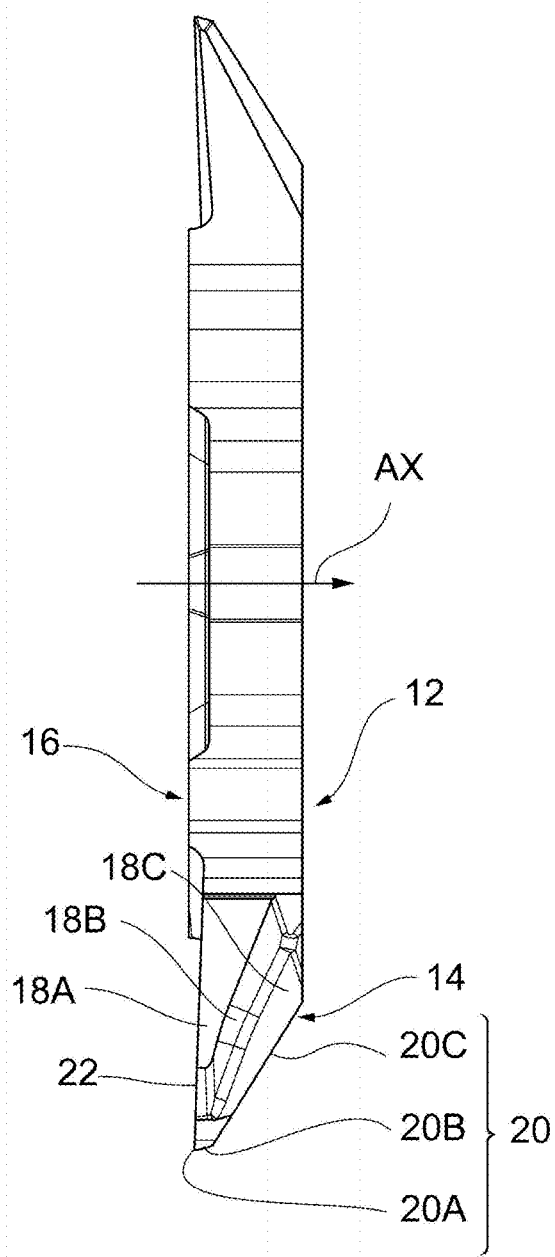
FIGS. 2A and 2B are respectively a plan view and a front view of the cutting insert 10.
Figure 2B:
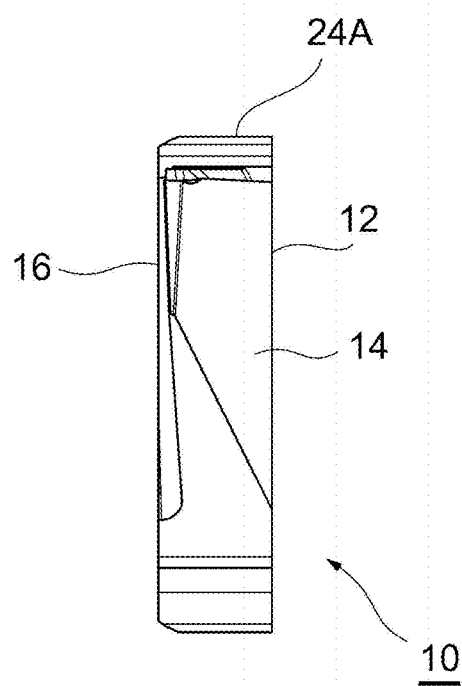

FIG. 1A is a perspective view of the cutting insert 10 for back turning according to the present embodiment, and FIG. 1B is a right side view of the cutting insert 10. FIG. 2A is a plan view of the cutting insert 10, and FIG. 2B is a front view of the cutting insert 10.

As shown in FIGS. 1A and 1B, the cutting insert 10 has a second end face 12 which is a plane and an end face 16 ("first end face", FIG. 2A) which is parallel to the second end face 12 and faces a direction opposite that of the second end face 12. A through hole H for passing a clamping screw for fixing the cutting insert 10 to a cutting tool is formed in a central portion of the second end face 12. During the back turning, the cutting insert 10 is moved relative to a workpiece W in the direction perpendicular to the center axis of the through hole H so as to cut into the workpiece W, and back turning of the workpiece W is performed by feeding in an axial feed direction AX ("first direction") which is the direction parallel to the center axis and facing the second end face 12 side. At this time, the end face 16 is opposite the face facing the axial feed direction AX at the surface of a step called "collar", which is to be formed at the workpiece W after the machining, that is, the collar back surface of the workpiece W.

Further, the cutting insert 10 also has a flank 14 that is connected to the second end face 12 and the end face 16 and faces the axial feed direction AX. This flank 14 is inclined with respect to the axial feed direction AX and has a plane portion forming an obtuse angle with the second end face 12 and forming an acute angle with the end face 16.

Also, the cutting insert 10 includes a top face 18 ("first face") connecting the flank 14, the end face 16 and the second end face 12 and including a rake face 18C. The top face 18 faces a direction perpendicular to the axial feed direction AX.

Further, the cutting insert 10 has a ridgeline 20 ("first ridgeline") connecting the top face 18 and the flank 14 and a ridgeline 22 ("second ridgeline") connecting the top face 18 and the end face 16.

The ridgeline 20 is provided with a nose portion 20A connected to the ridgeline 22, a front cutting edge 20B ("first cutting edge") connected to the nose portion 20A, and a main cutting edge 20C connected to the front cutting edge 20B.

Meanwhile, no cutting edge is formed on the ridgeline 22 (FIG. 2A).

FIG. 2A is a plan view of the cutting insert 10 as seen from the top face 18 side. As shown in the figure, the first ridgeline 20 is configured so that the angle with the axial feed direction AX stepwise increases as the distance from the end face 16 increases. Here, a portion where the front cutting edge 20B is formed has a slight angle and is substantially parallel to the axial feed direction AX, whereas the main cutting edge 20C is greatly inclined with respect to the axial feed direction AX. Further, as shown in the drawing, the front cutting edge 20B and the main cutting edge 20C can be configured to be substantially linear or linear when viewed from the top face 18 side.

Further, as shown in FIG. 2A, a chip breaker is formed in the region of the top face 18 between the ridgeline 20 and the ridgeline 22, the chip breaker including a chip breaker top portion 18A, a chip breaker wall face 18B which is connected to the chip breaker top portion 18A and faces the axial feed direction AX, and a rake face 18C which is connected to the chip breaker wall face 18B and provided between the chip breaker wall face 18B and the ridgeline 20. The chip breaker top portion 18A may be configured of a plane facing a direction substantially perpendicular to the axial feed direction AX or may be formed into a curved surface. The shape of the ridgeline connecting the chip breaker top portion 18A and the chip breaker wall face 18B will be described hereinbelow in detail with reference to FIG. 3. As shown in FIG. 2A, this ridgeline is inclined with respect to the axial feed direction AX so as to follow the main cutting edge 20C, but is configured so that the distance to the main cutting edge 20C, as viewed from the top face 18 side, decreases as the ridgeline approaches the front cutting edge 20B. The rake face 18C may include a flat portion connected to the ridgeline 20 or may be recessed so that the distance to the chip breaker top portion 18A increases and be connected to the chip breaker wall face 18B.

As shown in FIGS. 1A and 1B, two protruding portions 24A and 24B protruding in a direction perpendicular to the axial feed direction AX are provided in a portion of the top face 18 connected to the second end face 12 and the end face 16. Further, two protruding portions 24C and 24D protruding in a direction perpendicular to the axial feed direction AX are provided at positions symmetrical with respect to the axis of the through hole H of the cutting insert 10. As will be described hereinbelow, at the time of machining, a grip portion H1 and a grip portion H2 of the cutting tool 30 (FIG. 4B) are brought into contact with the region between the protruding portion 24A and the protruding portion 24B and between the protruding portion 24C and the protruding portion 24D, thereby fixing the cutting insert 10 to a cutting tool.

Figure 3:
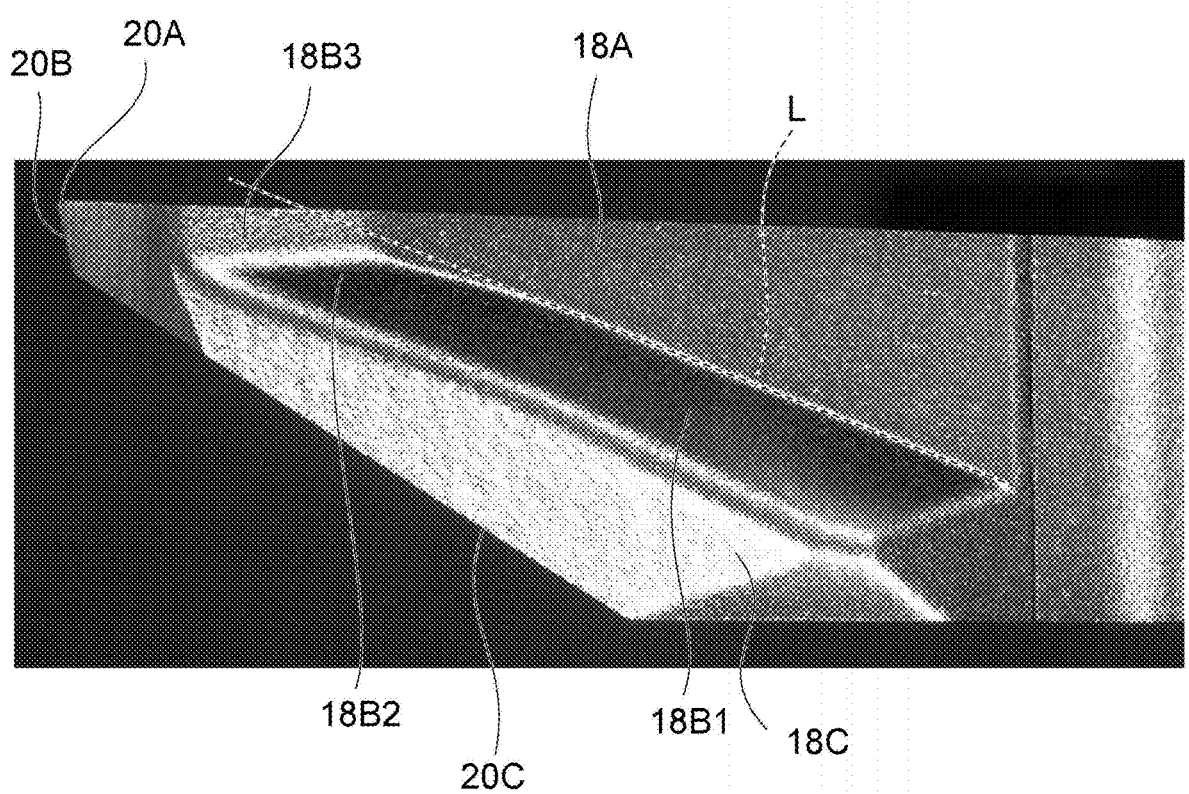
FIG. 3 is a partially enlarged view of the cutting insert 10.

FIG. 3 is an enlarged view of the distal end portion of the cutting insert 10 as viewed from the top face 18 side. As shown in the drawing, the chip breaker wall face 18B is provided with: a first wall face portion 18B1 ("first wall face portion") which is formed along the main cutting edge 20C, and is formed so as to approach the main cutting edge 20C as approaching the front cutting edge 20B; a third wall face portion 18B3 ("third wall face portion") which is close to the front cutting edge 20B and faces the main cutting edge side; and a second wall face portion 18B2 which is provided continuously with the first wall face portion 18B1 and connects the first wall face portion 18B1 and the third wall face portion 18B3.

As shown in FIG. 3, the ridgeline connecting the first wall face portion 18B1 and the chip breaker top portion 18A side is substantially linear when viewed from the top face 18 side. When a straight line L common to most of this ridgeline is drawn, it can be seen that the ridgeline connecting the second wall face portion 18B2 and the chip breaker top portion 18A is closer to the main cutting edge 20C side than the straight line L. In other words, the chip breaker is provided with a protruding portion bulging toward the main cutting edge 20C side at a connecting portion with the third wall face portion 18B3. In the present embodiment, the boundary line connecting the chip breaker wall face 18B and the rake face 18C likewise has a straight line portion and a curved portion which is continuously connected to the straight line portion and is curved toward the main cutting edge 20C side at a position close to the front cutting edge 20B.

The cutting insert 10 is formed to be symmetrical with respect to the axis of the through hole H, and a cutting edge and a chip breaker having the same shape are formed at the other end of the cutting insert 10.

Figure 4A:
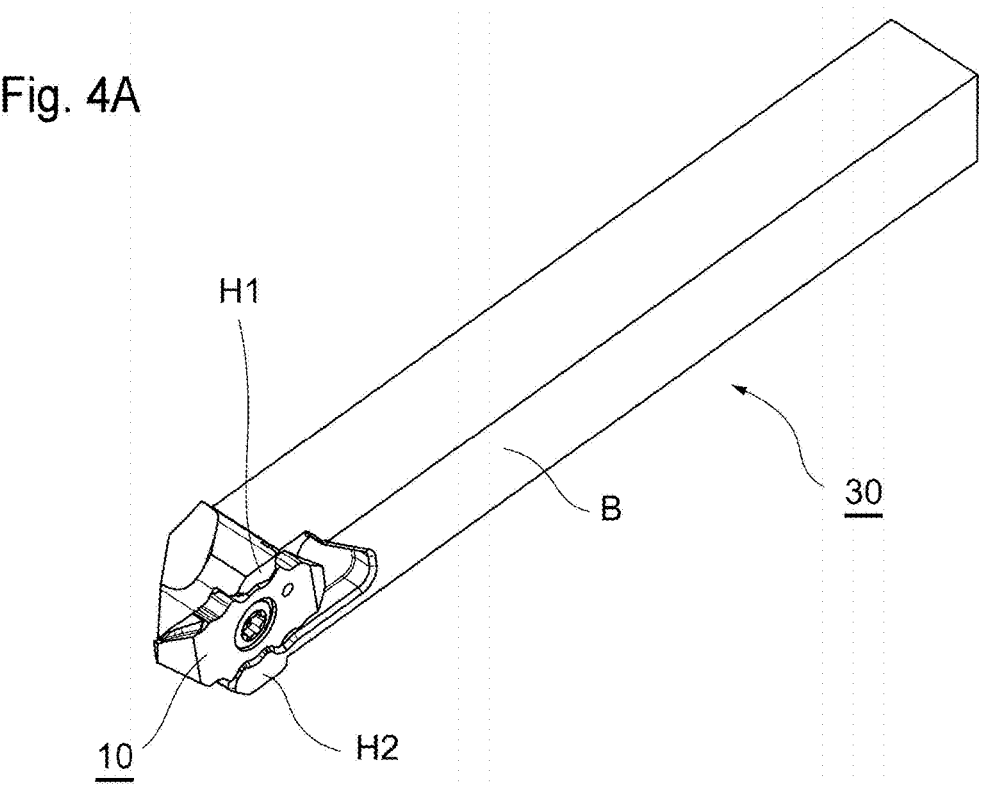
FIGS. 4A and 4B respectively show the cutting insert 10 and a cutting tool 30.
Figure 4B:
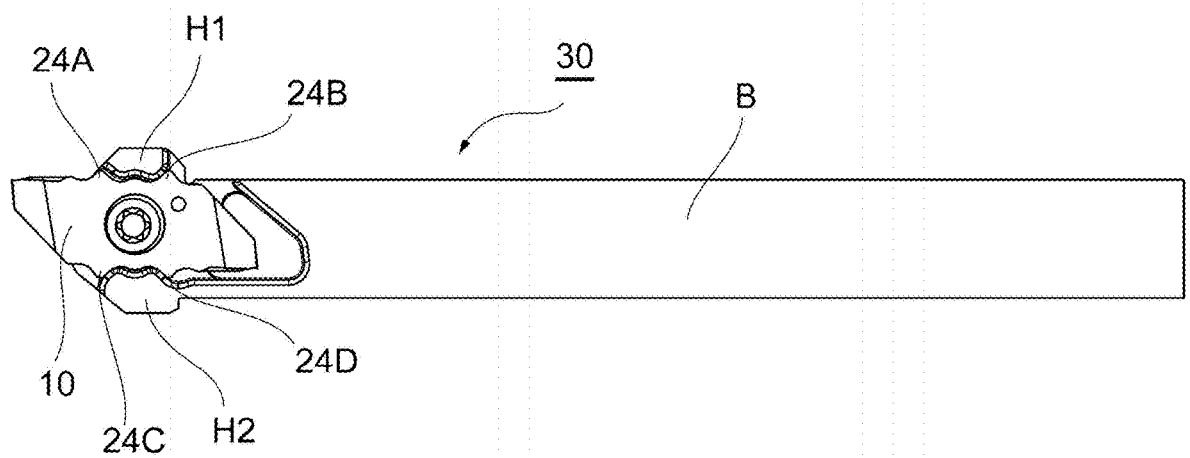

FIG. 4A is a perspective view of a cutting tool 30 to which the cutting insert 10 is fixed, and FIG. 4B is a right side view of the cutting tool 30.

As shown in this figure, the cutting tool 30 includes a body B and two grip portions H1 and H2. The cutting insert 10 is fixed to the cutting tool 30 by bringing the grip portion H1 into contact with the region between the protruding portion 24A and the protruding portion 24B, bringing the grip portion H2 into contact with the region between the protruding portion 24C and the protruding portion 24D, and screwing the clamping screw passing through the through hole H into a threaded portion provided in the cutting tool 30.

The results of a test in which such a cutting insert 10 and a comparative cutting insert IS were used for cutting with an automatic lathe will be described hereinbelow. The cutting insert IS is different from the cutting insert 10 in that the chip breaker wall face portion 18B2 is not provided (in other words, the chip breaker of the cutting insert IS does not have a protruding portion bulging toward the main cutting edge 20C side) and the chip breaker wall face portion 18B1 and the chip breaker wall face portion 18B3 are directly connected.

A workpiece W of carbon steel S45C ($\phi$16 mm×2000 mm) was cut under cutting conditions of a rotation speed N of the workpiece W=3000 rpm, a depth of cut ap=1 mm to 5 mm, feed f=0.03 mm/rev to 0.07 mm/rev, and external cutting fluid supply.

Figure 5A:
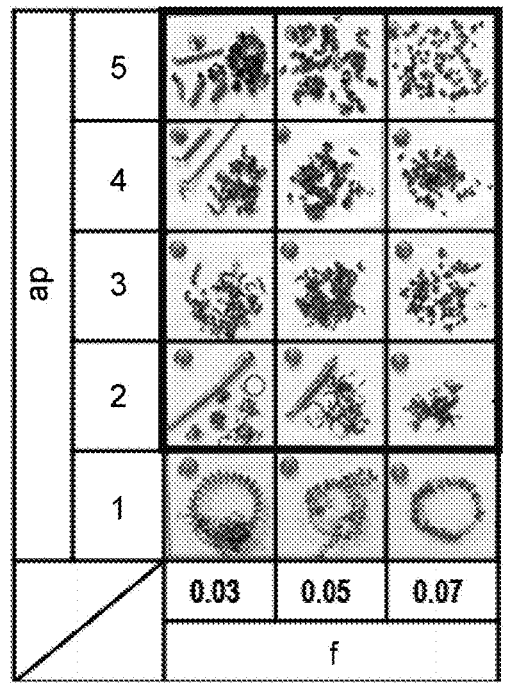
FIGS. 5A and 5B show examples of chips produced by cutting with the cutting insert 10.
Figure 5B:
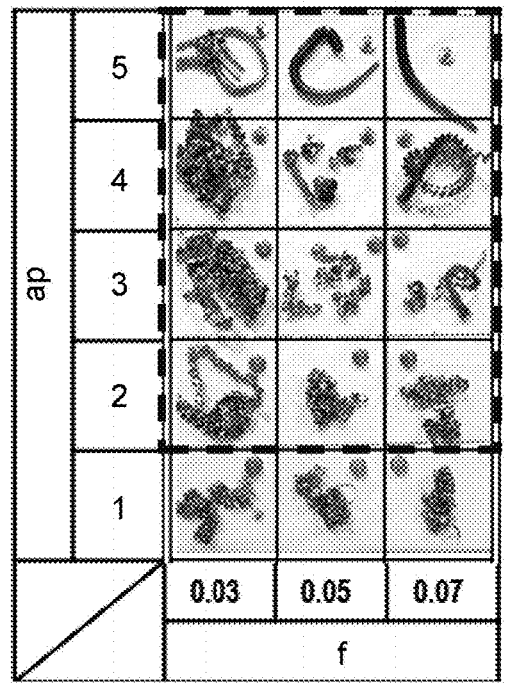

FIG. 5A shows the chips when the cutting insert 10 was used, and FIG. 5B shows the chips when the cutting insert IS was used.

As shown in the figure, it is generally understood that when the cutting insert 10 was used, the chips were cut short and the chip control performance was improved. For example, in the case of the depth of cut of ap=5 mm and the feed f=0.07 mm/rev, when the cutting insert IS was used, most of the chips were connected, whereas when the cutting insert 10 was used, the chips were finely divided. The difference in chip length was particularly remarkable in the case of the depth of cut of ap=2 mm or more.

The reason for this difference is thought to be that a force acts to bring the chip generated by the back turning into contact with the chip breaker wall face from the cutting edge and to curl the chip, and it is conceivable that in the chip breaker wall face of the cutting insert IS, only a portion mainly forming a single angle contributes to curling.

Meanwhile, in the case of the cutting insert 10, it is conceivable that as a result of providing the protruding portion, the chip is strongly pressed and bent at the chip breaker wall face 18B to further promote the curling of the chip.

In the case where a chip breaker is formed by grinding using a grindstone as in the related art, it is difficult to locally provide the protruding portions constituting the chip breaker wall face 18B. However, the protruding portions can be easily provided locally by forming the shape of the chip breaker in a die and forming the wall face side of the chip breaker shape by pressing and sintering. However, in the cutting insert 10 of this embodiment, the direction of the central axis of the through hole H is different from the direction of the top face 18 having the chip breaker. Therefore, it is impossible to press-mold the chip breaker shape and the through hole H at the same time by using an ordinary die. For example, two molding methods can be used to press-mold the chip breaker shape and the through hole H simultaneously. In one method, the through hole H is arranged in the normal pressing direction and the shape of the chip breaker is press molded, for example, by a lateral punch which moves laterally in a direction intersecting with the pressing direction. In the other method, the shape of the chip breaker is arranged in the normal pressing direction and the through hole H is press molded, for example, by a lateral punch which moves laterally in a direction intersecting with the pressing direction. In any of these methods, it is possible to press-mold the chip breaker shape and the through hole H at the same time by using a special die provided with a lateral punch instead of an ordinary die.

In the present embodiment, the flank and a part of the rake face (for example, the distal end portion) of the cutting insert 10 are formed by grinding, but the entire tool shape may be also formed only by pressing and sintering.

What is claimed is:

1. A cutting insert for back turning, comprising:
   a flank facing a first direction;
   a first end face connected to the flank and facing a direction opposite to the first direction;
   a first face connected to the flank and the first end face, and including a rake face;
   a first ridgeline connecting the flank and the first face so that an angle with the first direction increases as a distance from the first end face increases, when viewed from the first face side;
   a second ridgeline connecting the first end face and the first face; and
   a chip breaker formed at the first face between the first ridgeline and the second ridgeline, wherein
   a nose portion connected to the second ridgeline, a first cutting edge connected to the nose portion, and a second cutting edge connected to the first cutting edge are formed on the first ridgeline, and
   a chip breaker wall face, of the chip breaker, facing the first direction includes: when viewed from the first face side, a first wall face portion configured so that a ridgeline connecting a top portion of the chip breaker and the first wall face portion is a straight line; and a second wall face portion connected to the first wall face portion on the first cutting edge side and configured so that the ridgeline connecting the top portion of the chip breaker and the second wall face portion is closer to the second cutting edge side than the straight line.

2. The cutting insert for back turning according to claim 1, wherein
   the ridgeline connecting the top portion of the chip breaker and the first wall face portion is configured so that a distance to the first end face decreases as the ridgeline approaches the second wall face portion.

3. The cutting insert for back turning according to claim 1, wherein
   the chip breaker includes a third wall portion that faces the first cutting edge side and is connected to the second wall face portion.

4. The cutting insert for back turning according to claim 2, wherein
   the chip breaker includes a third wall portion that faces the first cutting edge side and is connected to the second wall face portion.

5. The cutting insert for back turning according to claim 1, further comprising a second end face connected to the flank, wherein
   the first end face is substantially parallel to the second end face.

6. The cutting insert for back turning according to claim 2, further comprising
   a second end face connected to the flank, wherein
   the first end face is substantially parallel to the second end face.

7. The cutting insert for back turning according to claim 3, further comprising
a second end face connected to the flank, wherein
the first end face is substantially parallel to the second end face.

8. The cutting insert for back turning according to claim 4, further comprising
a second end face connected to the flank, wherein
the first end face is substantially parallel to the second end face.

9. A cutting tool comprising the cutting insert for back turning according to claim 1.

10. A cutting tool comprising the cutting insert for back turning according to claim 2.

11. A cutting tool comprising the cutting insert for back turning according to claim 3.

12. A cutting tool comprising the cutting insert for back turning according to claim 4.

13. A cutting tool comprising the cutting insert for back turning according to claim 5.

14. A cutting tool comprising the cutting insert for back turning according to claim 6.

15. A cutting tool comprising the cutting insert for back turning according to claim 7.

16. A cutting tool comprising the cutting insert for back turning according to claim 8.

* * * * *